United States Patent [19]
Anetsberger et al.

[11] 3,877,615
[45] Apr. 15, 1975

[54] PIZZA SAUSAGE DISPENSER

[75] Inventors: Richard J. Anetsberger, Northbrook; Alfred L. Meyer, Libertyville, both of Ill.

[73] Assignee: Anetsberger Brothers, Inc., Northbrook, Ill.

[22] Filed: June 1, 1973

[21] Appl. No.: 366,308

[52] U.S. Cl. .............................. 222/263; 222/373
[51] Int. Cl. ............................................. G01f 11/00
[58] Field of Search ............ 222/334, 55, 373, 571, 222/193, 263; 91/464

[56] References Cited
UNITED STATES PATENTS

| | | | |
|---|---|---|---|
| 2,721,008 | 10/1955 | Morgan, Jr. ................... | 222/571 X |
| 3,177,846 | 4/1965 | Archer et al. .................. | 222/571 X |
| 3,341,076 | 9/1967 | Wasilewski et al. ............ | 222/334 X |
| 3,498,508 | 3/1970 | Francisoud .................... | 222/571 |

*Primary Examiner*—Stanley H. Tollberg
*Assistant Examiner*—Hadd Lane
*Attorney, Agent, or Firm*—Davis, McCaleb & Lucas

[57] ABSTRACT

Machine for automatically serially depositing individual portions of bulk sausage in variable arrangement onto any pizza skin supported by a tray held by the operator and in response to, and so long as, a foot treadle is depressed. Bulk sausage in hopper readily removable for cleaning is moved downwardly by pressure plate attached to lower end of ram of double-acting air cylinder, air pressure being supplied to both ends of cylinder when in operative condition and removed from lower end in response to treadle depression to avoid time lag in pressing sausage into single discharge nozzle mounted at lower end of hopper for quick removal for cleaning purposes. Release of foot treadle reapplies air pressure to lower end of cylinder so that restrained or only slight downward pressure is maintained on pressure plate. Depressing treadle also energizes pulse (on-off) timer to effect successive operations of air cut-off and discharge valve, each operation directing a blast of air through discharge nozzle to sever portion of sausage therein and eject same downwardly therefrom. Timer is adjustable to select desired frequency of discharges from nozzle of sausage portions, and a regulator enables variation of air cut-off and discharge pressure. Another regulator is selectively operable to vary the air pressure to the cylinder to determine the amount of sausage forced into the nozzle and compensate for differences in temperature and physical characteristics of different sausages. For use with pizza skins having a top coating of sauce, retarding means is provided for slowing downward movement of severed sausage portions to prevent splattering of sauce.

11 Claims, 9 Drawing Figures

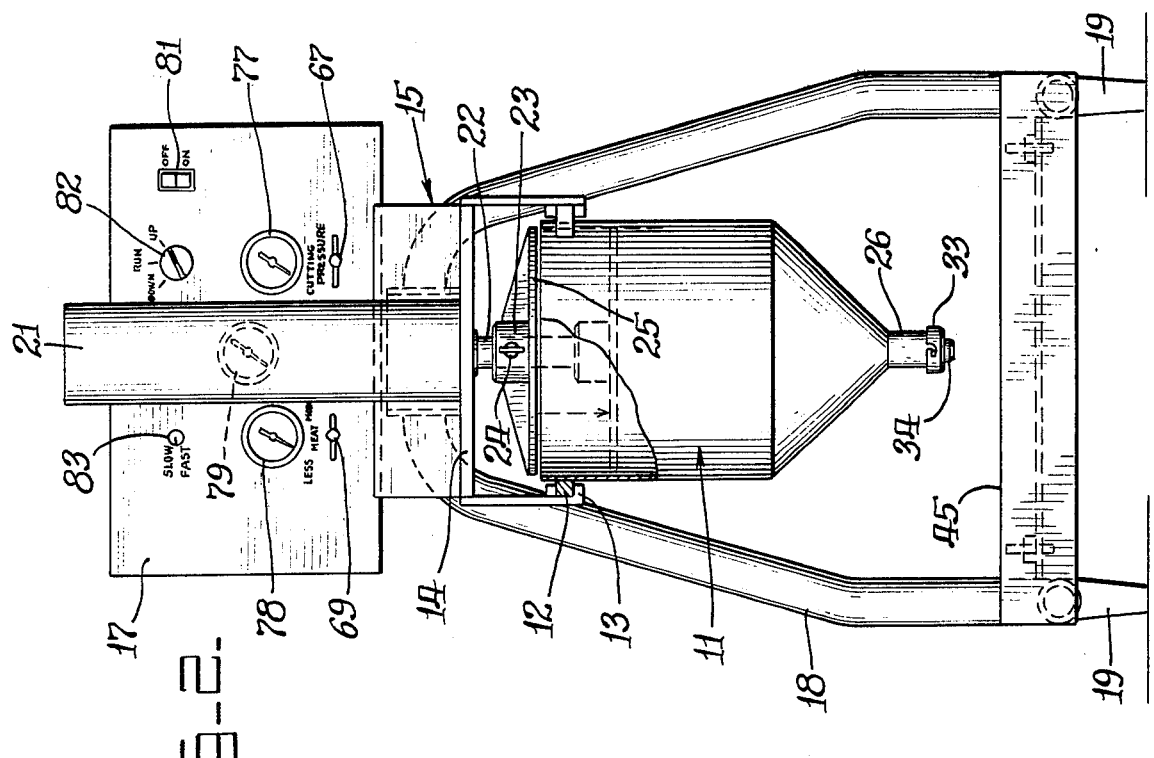
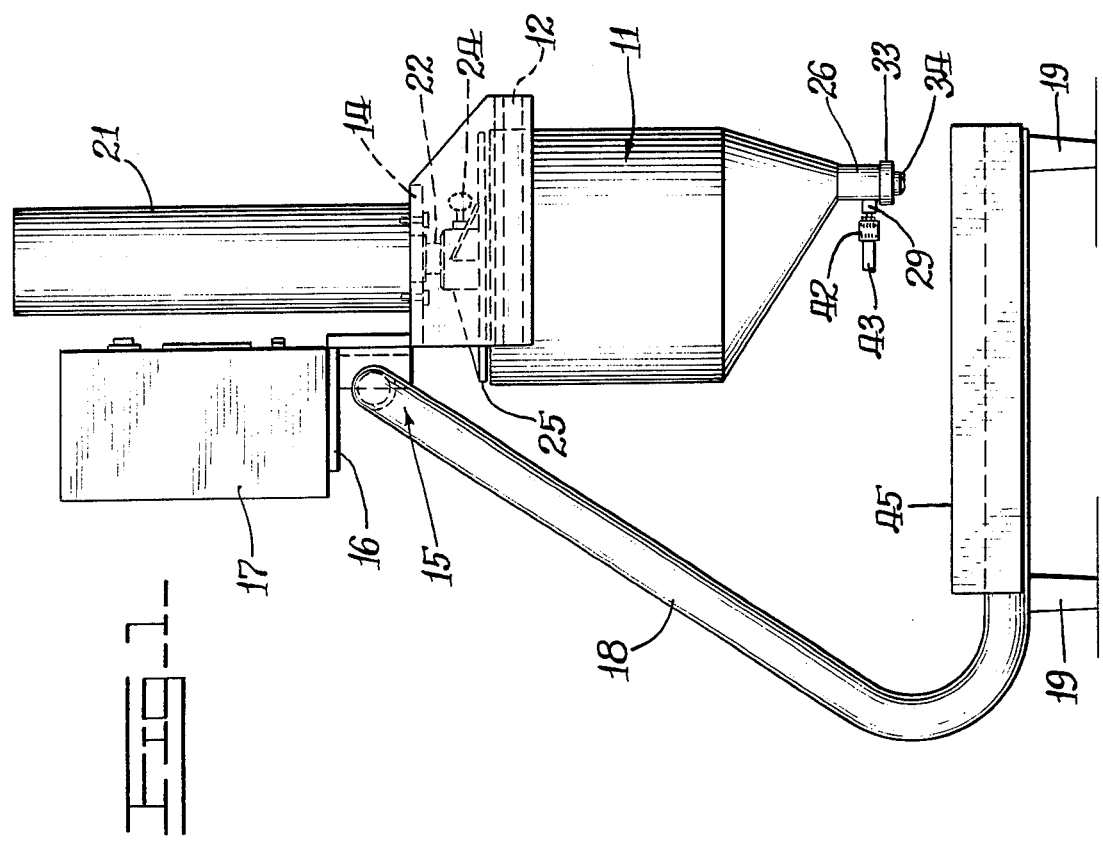

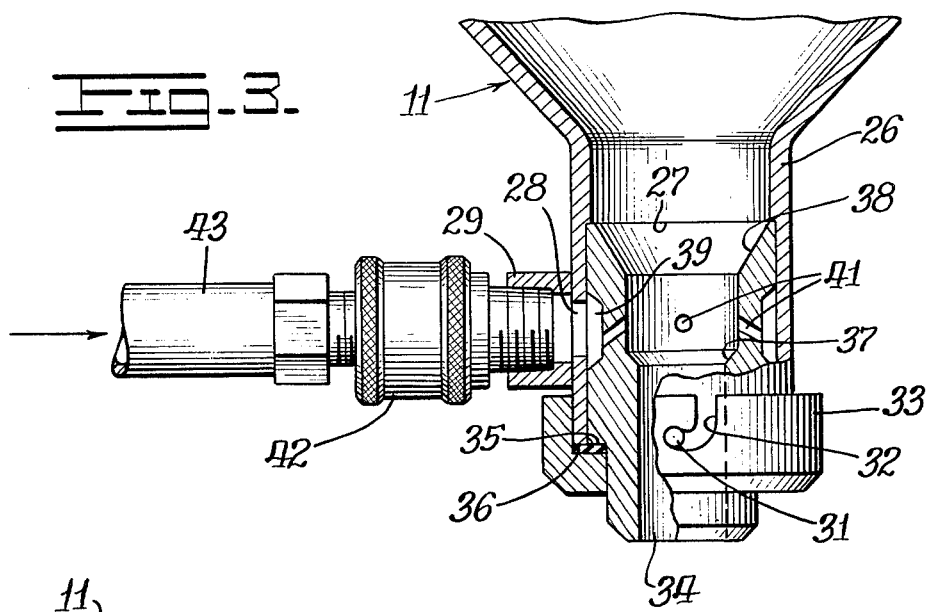
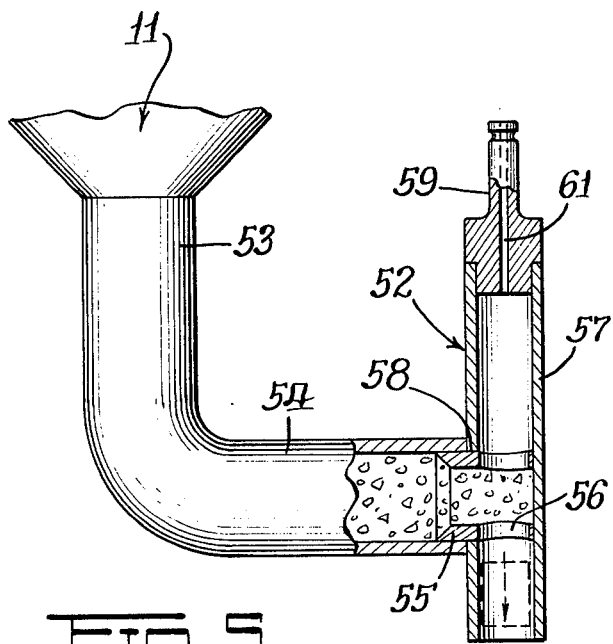
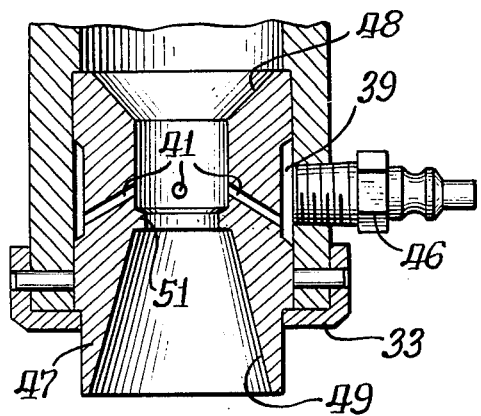
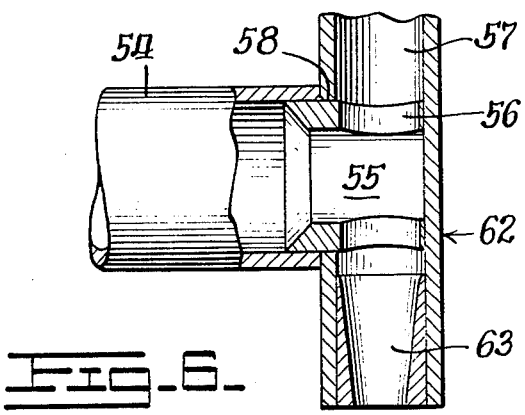
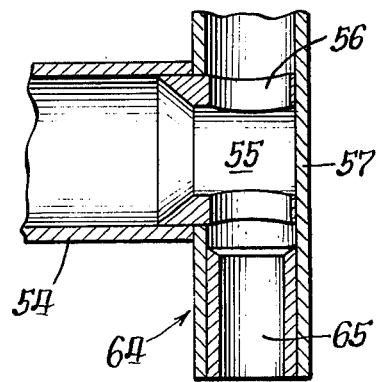

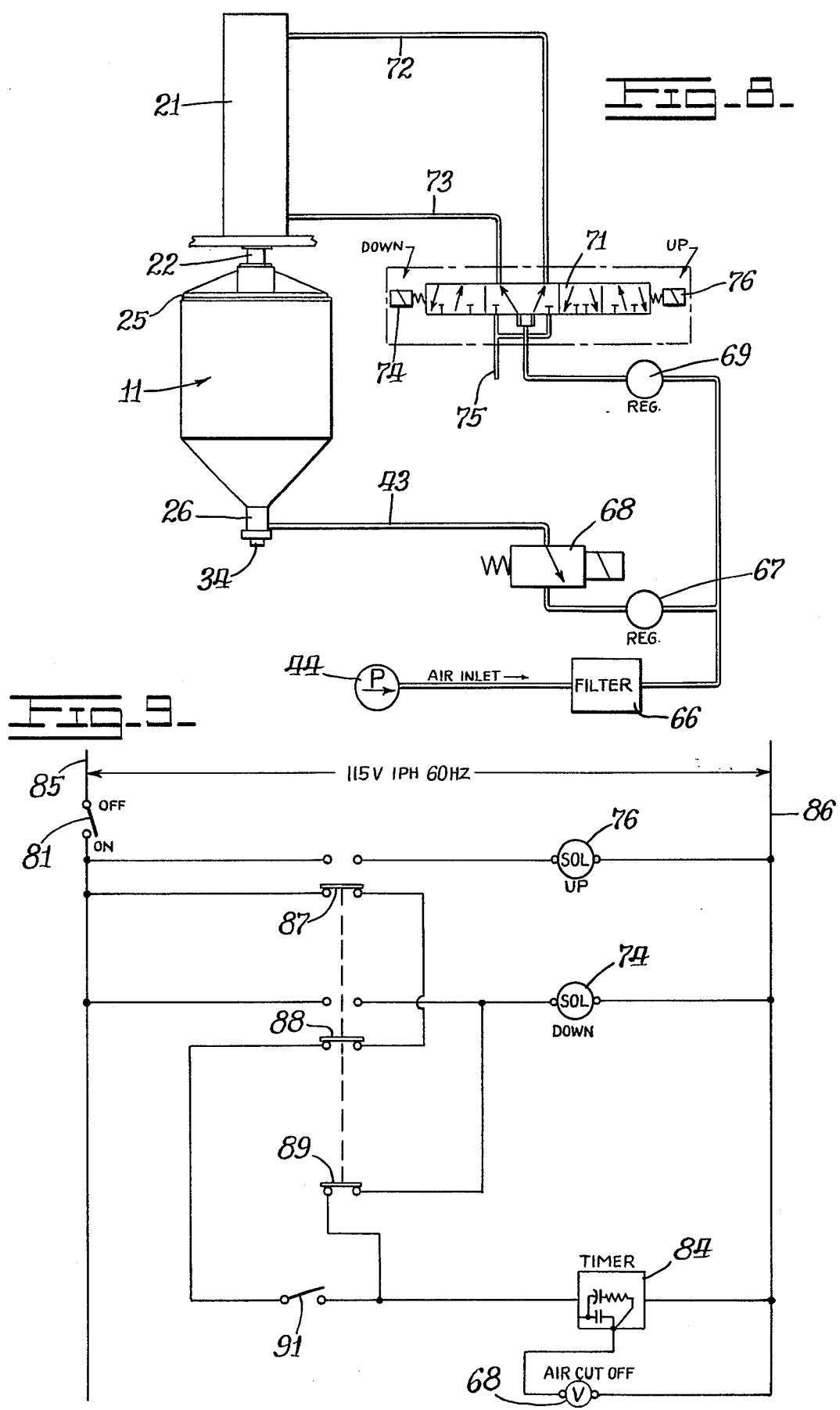

PIZZA SAUSAGE DISPENSER

BACKGROUND OF THE INVENTION

1. Field of the Invention

This invention relates in general to the making of pizza, and more particularly to a machine for depositing individual portions of bulk sausage onto a pizza skin.

2. Description of the Prior Art

Machines have been provided for depositing sausage portions onto pizza skins, but most are unsatisfactory because of the peculiarities of bulk sausage and particularly the extreme difficulties of keeping the machines clean during operation and cleaning the same after use. Some of these problems were solved by using air pressure to move bulk sausage downwardly from a container into a plurality of tubular discharge elements arranged in side-by-side relation in a predetermined pattern over the entire area of a pizza skin, and then applying a blast of air through horizontal apertures into each discharge element to sever the portion of sausage therein and discharge it downwardly therefrom, rather than using the previously employed blade means for cutting through the sausage. U.S. Pat. No., 3,403,712 shows such a machine, but it is difficult to clean after use and, as will readily be appreciated, absolute cleanliness is essential. The machine of that patent also is limited to one pattern of sausage portions on one size of pizza skin. While improvements have been made thereto enabling deposits of sausage portions through selectable ones of the discharge elements for use with pizza skins of different diameters, such cannot deposit sausage on only one part of a skin, as for a half-and-half pizza, and they obviously are relatively expensive. In addition, such prior machines cause splattering of the sauce when the pizza skin receiving the sausage has a top coating of sauce, so that either the sauce must be added after deposit of the sausage or a coating or layer of some material more viscous than the sauce, such as cheese, must first be placed over the sauce.

SUMMARY OF THE INVENTION

This invention provides a relatively inexpensive and simple machine which overcomes the difficulties of those prior devices by employing only a single discharge nozzle readily detachable from the lower end of a supply hopper to facilitate easy and thorough cleaning, and a double-acting air cylinder for actuating a pressure plate to retain bulk sausage under slight pressure in the hopper in run condition and to instantly press the sausage downwardly into the discharge nozzle in response to operation of a control member, such as a foot treadle, which also effects operation of a selectively variable pulse timer that causes successive operations of an air valve, each directing a blast of air through the discharge nozzle to sever the terminal portion of sausage therein and eject the same downwardly therefrom. Similar individual portions of sausage thus are serially expelled until release of the control member, whereby an operator may effect deposit of any desired number of individual portions on any part or parts of any size or shape of pizza skin by holding the same on a tray under the discharge nozzle and moving it relative thereto. The invention also provides for selective variations in the air cut-off and discharge pressure, and in the air pressure to the cylinder to compensate for temperature changes and the physical characteristics of different sausages. And for use with pizza skins having a top coating of sauce, a retarding means is provided for slowing downward movement of severed sausage portions to prevent splattering of the sauce.

In the drawings:

FIG. 1 is a side elevation of a machine embodying the invention;

FIG. 2 is a front elevation, as seen from the right of FIG. 1;

FIG. 3 is a detail side elevation of the discharge nozzle of FIG. 1 on an enlarged scale and with parts in vertical section;

FIG. 4 is a detail vertical sectional view similar to FIG. 3 of a modified form of discharge nozzle;

FIG. 5 is a side elevation similar to FIG. 3 of a second modified form of discharge nozzle, with parts in vertical section;

FIG. 6 is a view similar to FIG. 5 of a third modified form of discharge nozzle;

FIG. 7 is a detail vertical section through a fourth modified form of discharge nozzle;

FIG. 8 is a diagram of the pneumatic mechanism and controls of the machine; and

FIG. 9 is a diagram of the electric circuit employed.

DESCRIPTION OF THE PREFERRED EMBODIMENT

As best seen in FIGS. 1 and 2, the pizza sausage dispenser comprises a hopper indicated generally by reference numeral 11 which is open at the top and has side rails 12 secured in any suitable manner to its outer surface for sliding engagement in horizontal tracks 13 depending from a front shelf portion 14 of a hopper support generally designated by numeral 15. This support 15 also has a rear shelf 16 mounting a control casing and panel 17 and includes a frame 18 having adjustable legs 19.

Pressure means comprising a double-acting air cylinder 21 with a ram therein is mounted in any suitable manner in vertical position on the front shelf 14. A rod 22 is connected to the lower end of the ram, extends through an aperture in the shelf and, by means of an adapter 23 and thumb screw 24, is readily removably secured at its lower end to a pressure plate 25. Thus, with the pressure plate in its upper position shown in full lines in FIG. 2, the hopper 11 may be mounted in vertical alignment with the pressure plate 25 by sliding the side rails 12 into, and rearwardly relative to, the tracks 13.

The lower portion of the hopper 11 is gradually reduced in horizontal cross section and terminates in a tubular end 26 counterbored to provide an interior shoulder 27. The rear wall of this tubular end portion 26 has an air inlet aperture 28 (FIG. 3) horizontally aligned with, and circumscribed by, an interiorly threaded collar or fitting 29 which is secured to the hopper 11 in any suitable manner. Extending laterally from the tubular end 26 are a pair of diametrically opposed pins 31 which cooperate with slots 32 in a cap ring or support collar 33 as a quickly releasable bayonet joint to retain a cut-off and discharge nozzle 34 within the lower end of the hopper, with the upper end of the nozzle 34 in engagement with the inner shoulder 27. The lower end of the nozzle 34 is reduced exteriorly to provide an outer shoulder 35 for cooperation with the support collar 33, and a gasket 36 preferably is interposed between that shoulder 35, the lower end of tubular portion 26 of the hopper and the collar 33. The upper part of the bore of the nozzle 35 is enlarged to provide an angularly disposed annular shoulder 37, and at its upper end it flares outwardly to define an annular lead-in surface 38 joining the inner edge of the shoulder 27. The outer surface of nozzle 34 has a peripheral groove 39 which is aligned with the air inlet aperture 28 when the nozzle is in its operative position of FIG. 3, and a plurality of apertures 41, preferably four in number and sloping upward and inward at an angle of approximately 30° from horizontal, are equally spaced around the nozzle and extend therethrough from the groove 39. A quickly detachable nipple or fitting 42 may be screwed into the collar 29 to connect an air hose or conduit 43 for delivering air under pressure to the nozzle 34 in a manner to be later described and from a suitable supply indicated at 44 in FIG. 8.

Briefly, the operation of the mechanism hereinbefore noted and to be described in greater detail hereinafter comprises downward movement of the pressure plate 25 by the ram of the double-acting air cylinder 21 into the hopper 11 to force the sausage that has been placed therein downwardly into the lower tubular portion 26 and the chamber formed by the discharge nozzle 34. Such feeding of the sausage into the nozzle 34 is retarded by the lead-in surface 38 and the annular shoulder 37 in the nozzle and continues until a lower terminal portion substantially fills the bore of the nozzle 34. A blast of air supplied through the hose 43 and the fitting 42 and air inlet aperture 28 is directed by the peripheral groove 39 to the several apertures 41 in the nozzle. Such a blast of air severs or cuts off the portion of the sausage in the nozzle below those apertures 41 and discharges the same downwardly from the nozzle. It will be understood, of course, that an operator has positioned a pizza skin on the usual holder below the discharge nozzle 34 before such operation. To facilitate retaining the pizza skin and its holder in proper position to receive successive portions of sausage thus discharged from the nozzle 34, a suitable table top 45 is mounted on the frame 18 a short distance below the nozzle. Between successive operations to eject a terminal portion of the sausage from the nozzle 34, the operator will move the pizza skin horizontally and thereby will be enabled to place the successive portions of sausage in any selected position or on any desired part of the pizza skin.

In some instances, an operator will prefer to spread sauce over the surface of a pizza skin on top of cheese, or the like, first applied thereto and before depositing sausage thereon with the dispenser of this invention. Under such circumstances, it has been found that splattering of the sauce may occur. A modified form of cut-off and discharge nozzle to avoid such splattering is disclosed in FIG. 4. In that illustration, the lower tubular end 26 of the hopper is shown as having a modified nipple or fitting 46 for supplying air in the same manner as the previously described fitting 42, and the modified cut-off and discharge nozzle 47 as being retained, as in the structure of FIG. 3, by bayonet joint pins 31 and a support collar 33. The bore of the nozzle 47 has a shallow lead-in portion 48 at its upper end and a downwardly and outwardly sloping conical portion 49 at its lower end which extends for somewhat more than half the vertical length of the bore. At the upper end of that conical portion 49, the bore is reduced to provide an annular flange 51 which, together with the lead-in portion 48, retards downward movement of sausage by the pressure plate 25. The upper portion of the nozzle 47 is provided with a peripheral groove 39 and apertures 41 in the same manner as in the nozzle 34. Upon introduction of blasts of air under pressure through the apertures 41, the terminal portion of the sausage disposed or receiver in the upper portion of the nozzle 47 will be severed and impelled downwardly in the same manner as in the nozzle 34. However, because of the downwardly increasing cross-section of the lower conical portion 49, such severed portion of sausage will be gently dropped from the discharge nozzle 47 rather than being more forcefully ejected as is the case with the nozzle 34. Therefore, with this modification of FIG. 4, sausage portions may be rapidly dispensed onto a pizza skin covered with a layer of sauce without any undue splattering of the latter.

A second modified form of cut-off and discharge nozzle indicated generally by reference numeral 52 is illustrated in FIG. 5. In this modification, the lower tubular end 53 of the hopper is formed with, or has attached thereto in any suitable manner, a horizontally extending terminal portion 54 to define an elbow connection within the outer end of which is press fitted a tubular fitting 55 having vertically disposed apertures 56 extending therethrough beyond the end of the horizontal portion 54. A vertical discharge tube 57 is provided with a side wall aperture 58 slidable onto the tubular fitting 55 and with a cap member 59 press fited into its upper end. This cap member 59 has a vertical bore 61 into which blasts of air under pressure are introduced in the same manner as through the hose 43 and fitting 42. Downward movement of the pressure plate 25 will force sausage from the hopper into and through the horizontal extension or terminal portion 54 to fill the tubular fitting 55. A blast of air supplied through the bore 61 then will sever the terminal portion of the sausage so disposed or receiver within the tubular fitting 55 and discharge the same downwardly through the lower open end of the vertical tube 57.

A third modified form of discharge nozzle indicated generally by reference numeral 62 is illustrated in FIG. 6 as comprising the same arrangement as just described relative to FIG. 5 with the addition, in the lower end of the vertical tube 57, of a discharge retarding insert 63 which comprises a tube press fitted into the vertical tube 57 having a bore which decreases in diameter from top to bottom. This insert 63 has the affect of compacting the terminal portion of sausage being discharged and increasing its rate of discharge.

A fourth modified form of discharge nozzle is illustrated in FIG. 7 and indicated generally by reference numeral 64. As in the cases of the modifications shown in FIGS. 5 and 6, this nozzle 64 includes the numbers 54–61 and is provided in the lower end of the vertical tube 57 with a tubular insert 65 press fitted therein. This insert 65 acts to initially retard the discharge of the terminal portion of sausage from the tubular fitting 55, slightly compacts it and, thereafter, offers little resistance to its movement from the nozzle.

It will be appreciated that with all of these several modifications, quick detachment of the several parts and removal from the frame and the hopper greatly simplifies cleaning thereof after a normal period of use which is of extreme importance when dealing with such a perishable material as bulk sausage. In this connection, it is a simple matter to disconnect the fitting 42 or that attached to the cap 59 and to slide the hopper 11 out of the tracks 13. The removal of any of the nozzles 34, 46, 52, 62 or 64 from the hopper also is a simple operation, as is the removal of the pressure plate 25 which is effected by merely loosening the thumb screw 24.

Referring now to FIG. 8, it will be seen that the air supply 44 is connected through a filter 66, a suitable selectively adjustable pressure regulator 67 and a normally closed air discharge valve 68 to the hose 43 for effecting air cut-off and discharge from the nozzle 34 of the terminal portion of sausage therein. For operating the double-acting cylinder 21, the air supply 44 also is connected through filter 66 and a second selectively adjustable pressure regulator 69 to a multiple position control valve 71 which is normally positioned to supply air to both the top and bottom ends of cylinder 21 through hoses 72 and 73, respectively. When it is desired to move the pressure plate 25 down to force sausage into the discharge nozzle, a "DOWN" solenoid 74 is energized which moves the valve 71 to connect only the hose 72 to supply air under pressure to the top end of cylinder 21, and connects the hose 73 from the bottom end of the cylinder to an air discharge conduit 75. Deenergization of solenoid 74 enables automatic spring return of valve 71 to its normal "RUN" position to supply air under pressure to both ends of cylinder 21. It will be understood that in such "RUN" condition, slight or restrained downward pressure will be exerted by the pressure plate 25 on the sausage in the hopper 11 because the area of the upper end of the ram in cylinder 21 is greater than the effective area of the lower end of the ram by the difference of the cross sectional area of the rod 22. In the illustrated embodiment, this area, and therefore pressure, difference is approximately 10 percent. Such difference in effective pressures at opposite ends of the cylinder 21 is sufficient to move the lower portion of the sausage downward into the tubular lower end of the hopper 11, but is insufficient to move it farther and into the central or lower portion of nozzle 34 or 47 or the outer end of the tubular fitting 55. This is important because the operational lag of prior air-operated sausage dispensers is thus avoided and instant feeding of sausage into the discharge nozzle is effected merely by removing the air pressure against the lower end of the ram in cylinder 21.

Whenever it is desired to move the pressure plate upwardly relative to the hopper 11, as to enable removal of the latter, an "UP" solenoid 76 is energized which moves the valve 71 to continue the supply of air under pressure to the lower end of cylinder 21 through hose 73, and connects the hose 72 from the top of the cylinder to the air discharge conduit 75.

The air pressure regulators 67 and 69 are mounted for convenient selective operation on the control panel 17, as shown in FIG. 2, and guages 77 and 78 thereon display the specific cut-off or discharge pressure, and the sausage feed pressure, respectively determined by regulators 67 and 69. A third guage 79 on control panel 17 displays the pressure of the air available from the supply means 44. Also mounted on panel 17 for selective operation are a main switch 81, a mode selector control 82, and the manually operable control 83 for a pulse (on-off) timer 84 (FIG. 9) which, when energized, effects successive operations of the air discharge valve 68. It will be understood that the control member 83 is selectively adjustable to vary the frequency of the successive operations of the air cut-off and discharge valve 68 in accordance with the particular requirements of any operator, and the operator readily may vary the character of the sausage discharge by the nozzle employed by selective operation of the regulator 67. This, as well as the regulator 69, will determine the quantity of each terminal portion dispensed, and regulator 69 also may be employed to compensate for differences in temperature and physical characteristics of different sausages.

Referring to FIG. 9, it will be seen that the main switch 81 is disposed in one line 85 which, with the other line 86, comprises a suitable electric current supply. Mode selector means manually operable by the control 82 (FIG. 2) comprises a switch having multiple contacts shown in FIG. 9 as three in number indicated by reference numerals 87, 88 and 89. And a control member, preferably a foot treadle normally spring-urged upwardly, may be selectively operated to close a control switch 91 which is illustrated in FIG. 9 as effecting operation of the pulse timer 84 when the contacts 87 and 88 are in their lower positions as shown therein. At the same time, if the lower contact 89 is down as therein illustrated, closing of control switch 91 will energize "DOWN" solenoid 74. The three contacts 87, 88, 89 are so disposed in their down positions by moving the mode selector control 82 (FIG. 2) to its central "RUN" position. Then individual portions of bulk sausage will be serially discharged from the hopper 11 through the nozzle 34 so long as the control member switch 91 is held closed. Release of the control member to effect opening of switch 91 will deenergize the "DOWN" solenoid 74 to cause spring return of the control valve 71 to its normal position of FIG. 8. This supplies air under pressure to both ends of the cylinder 21 to cause the previously described "restrained" downward movement of pressure plate 25.

Moving the mode selector control 82 to its righthand "UP" position shown in FIG. 2 will dispose the top contact 87 in its up position while the other contacts 88 and 89 remain in their down position. The mode selector means thus will cause energization of the "UP" solenoid 76, as can be understood from FIG. 9, and this also renders operation of control means switch 91 ineffective. As previously described, energization of "UP" solenoid 76 supplies air under pressure only to the lower end of cylinder 21, so that the pressure plate 25 will be lifted and held above the hopper 11.

Moving of mode selector control 82 to its lefthand (as seen in FIG. 2) "DOWN" position will dispose the top contact 87 in its down position of FIG. 9 and the other contacts 88 and 89 in their up positions. The mode selector means thus will cause energization of the "DOWN" solenoid 74 which moves the control valve 71 to cause the supply of air under pressure only to the upper end of cylinder 21 to move the pressure plate downwardly into the hopper 11. It will thus be seen that the mode control 82 may be moved selectively to position the multiple contacts of the mode selector means to effect upward, downward or restrained downward movements of the pressure plate 25.

It is thought that the invention and many of its attendant advantages will be understood from the foregoing description, and it will be apparent that various changes may be made in the form, construction, and arrangement of the parts without departing from the

We claim:

1. In a machine for automatically serially depositing individual portions of bulk sausage on a pizza skin from a hopper by means of air from a supply of air under pressure and in response to pressure means for forcing the sausage downwardly in the hopper, a single discharge nozzle removably mounted on the lower end of said hopper for ready cleaning, said discharge nozzle including a sausage inlet and a chamber to receive one of said portions, an air blast outlet between said sausage inlet and said chamber, control means including a control member selectively operable to cause said pressure means to continuously move sausage into said discharge nozzle, a normally closed air discharge valve interconnected between said air supply and the air blast outlet in said nozzle, and a pulse timer operable in response to operation of said control member to effect successive operations of said air valve, during continuing operation of said pressure means whereby each valve operation delivers a blast of air to said discharge nozzle to sever the portion of sausage in said chamber and eject the same downwardly therefrom and a plurality of portions thus may be ejected successively during a single continuing operation of said pressure means.

2. A machine according to claim 1, wherein said pulse timer is selectively adjustable to vary the frequency of the successive operations of said air valve effected thereby.

3. A machine according to claim 1, wherein said pressure means is adjustable to compensate for differences in temperature and physical characteristics of different sausages encountered.

4. A machine according to claim 1, wherein said control means also comprises manually operable mode selector means for effecting operation of said pressure means independently of said control member.

5. A machine according to claim 4, wherein said pressure means includes a pressure plate movable vertically relative to said hopper, and said mode selector means comprises a switch having multiple contacts positionable to effect upward, downward or restrained downward movements of said pressure plate.

6. In a machine according to claim 1, selectively adjustable regulator means interposed between said air supply and said nozzle to provide variations in air cutoff and discharge pressure.

7. In a machine for automatically serially depositing individual portions of bulk sausage in variable arrangement on any pizza skin from a hopper by means of air from a supply of air under pressure and in response to pressure means for forcing the sausage downwardly in the hopper, a single discharge nozzle removably mounted on the lower end of said hopper for ready cleaning, control means including a control member operable to cause said pressure means to move sausage into said discharge nozzle, a normally closed air discharge valve interconnected between said air supply and said nozzle, and a pulse timer operable in response to operation of said control member to effect successive operations of said air valve, whereby each valve operation delivers a blast of air to said discharge nozzle to sever the terminal portion of sausage therein and eject the same downwardly therefrom, wherein said pressure means comprises a double-acting air cylinder, a control valve normally supplying air to both ends of said cylinder from said air supply, air discharge means, a ram within said cylinder, a pressure plate movable downwardly into said hopper, and a rod interconnecting the lower end of said ram and said pressure plate, with said control valve being operable in response to operation of said control member to interrupt connection between said air supply and the lower end of said cylinder and connect the latter to said air discharge means.

8. A machine according to claim 7, wherein release of said control member causes operation of said control valve to again supply air to both ends of said cylinder, and mode selector means selectively operable to actuate said control valve to interrupt connection between said air supply and the upper end of said cylinder and connect the latter to said air discharge means to effect raising of said pressure plate.

9. A machine according to claim 1, wherein said discharge nozzle is provided with a quickly detachable fitting connecting the same to said air discharge valve.

10. A machine according to claim 1, wherein said discharge nozzle comprises a vertical bore connected at its upper end with said air discharge valve, and an elbow connection from the lower end of said hopper into said bore to direct sausage horizontally into the latter in response to operation of said pressure means.

11. In a machine according to claim 1 for depositing individual sausage portions on a pizza skin having a top coating of sauce, retarding means for slowing the downward movement of each said severed portion to prevent splattering of said sauce thereby.

* * * * *